United States Patent
Risso et al.

(10) Patent No.: US 9,348,882 B2
(45) Date of Patent: May 24, 2016

(54) METHOD, SYSTEM, AND COMPUTER READABLE MEDIUM FOR LONG TERM ARCHIVING OF DATA IN A MES SYSTEM

(71) Applicant: SIEMENS AKTIENGESELLSCHAFT, Munich (DE)

(72) Inventors: Federico Risso, Genoa (IT); Marco Mazzarone, Genoa (IT)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 221 days.

(21) Appl. No.: 14/057,176

(22) Filed: Oct. 18, 2013

(65) Prior Publication Data

US 2014/0114923 A1   Apr. 24, 2014

(30) Foreign Application Priority Data

Oct. 18, 2012   (EP) ..................... 12189048

(51) Int. Cl.
*G06F 17/30* (2006.01)
(52) U.S. Cl.
CPC ........ *G06F 17/30575* (2013.01); *G06F 17/303* (2013.01); *G06F 17/30067* (2013.01); *G06F 17/30233* (2013.01)

(58) Field of Classification Search
CPC ............ G06F 17/30575; G06F 17/303; G06F 17/30067; G06F 17/30233
USPC ........ 707/704, 623, 679, 661, 655, 665, 671, 707/668, 705, 792, 802, 796, 809, 667; 715/825
See application file for complete search history.

(56) References Cited

U.S. PATENT DOCUMENTS

| | | | |
|---|---|---|---|
| 5,084,789 A * | 1/1992 | Kamo et al. ................. 360/53 |
| 5,404,507 A * | 4/1995 | Bohm et al. |
| 5,530,939 A * | 6/1996 | Mansfield et al. |
| 5,991,771 A * | 11/1999 | Falls et al. |
| 6,047,294 A * | 4/2000 | Deshayes et al. |

(Continued)

OTHER PUBLICATIONS

Ciu Jin et al; Research and Application of Data Archiving based on Oracle Dual Database Structure; pp. 844-848; Journal of Software; ISSN:1796-217x; DOI: 10.4304; xp 055056152; 2012; CN; Apr. 27, 2012.

(Continued)

*Primary Examiner* — Frantz Coby
(74) *Attorney, Agent, or Firm* — Laurence Greenberg; Werner Stemer; Ralph Locher

(57) ABSTRACT

A method transfers data to be archived from a runtime database into an archive database. A temporary database acts as a buffer database for a selected data record set for archiving. For each table of the runtime table subset, the selected record subset to be archived is copied into its corresponding table of the temporary table set. For each table of the temporary table set, the selected record subset to be archived is copied into its corresponding table of the archive table subset. For each table of the temporary table set, a temporary deletion table containing a set of primary keys of the records to be deleted from the runtime database is created. In the runtime database, for each runtime table having a corresponding temporary deletion table of the set of temporary deletion tables, deleting records having a primary key matching the primary key set of its corresponding temporary table.

3 Claims, 1 Drawing Sheet

(56) References Cited

U.S. PATENT DOCUMENTS

| | | | |
|---|---|---|---|
| 6,078,933 A * | 6/2000 | Szalwinski | |
| 6,151,608 A * | 11/2000 | Abrams | 707/679 |
| 6,240,427 B1 * | 5/2001 | Szalwinski et al. | |
| 6,353,452 B1 * | 3/2002 | Hamada et al. | 715/825 |
| 6,374,262 B1 * | 4/2002 | Kodama | 707/623 |
| 6,490,598 B1 * | 12/2002 | Taylor | |
| 6,651,074 B1 * | 11/2003 | Taylor | 707/704 |
| 6,763,179 B1 * | 7/2004 | Park | G11B 20/12 386/241 |
| 6,907,464 B1 * | 6/2005 | Park | G11B 27/034 386/283 |
| 7,308,191 B2 * | 12/2007 | Park | G11B 20/12 386/289 |
| 7,548,898 B1 * | 6/2009 | Tarenskeen et al. | |
| 7,584,204 B2 * | 9/2009 | Kapoor | G06F 17/30542 |
| 7,844,578 B2 * | 11/2010 | Surma | G06F 9/5027 707/661 |
| 9,031,912 B1 * | 5/2015 | Rogers | G06F 17/30082 707/640 |
| 2014/0006356 A1 * | 1/2014 | Held | G06F 17/30595 707/667 |

OTHER PUBLICATIONS

Lee J. et al; Optimizing fab performance with MES-database active archiving; pp. 55-56 +58; Solid State Technology, Pennwell Corporation, Tulsa, OK; ISSN: 0038-11x; xp 001170216; 2003; US; Apr. 1, 2003.

* cited by examiner

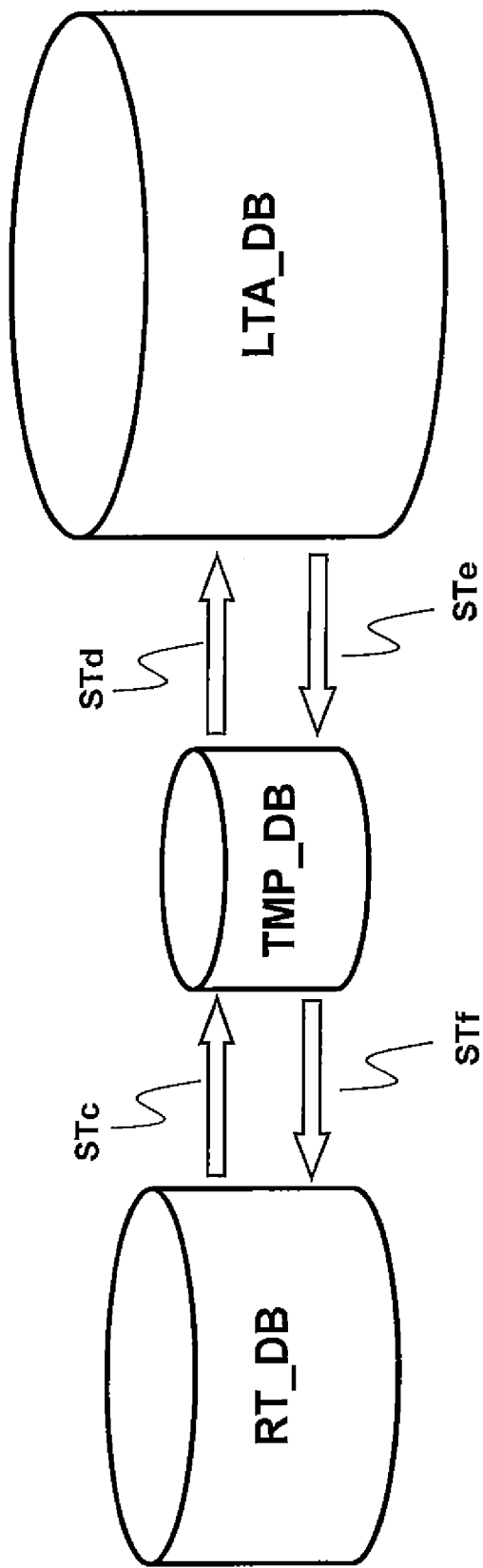

METHOD, SYSTEM, AND COMPUTER READABLE MEDIUM FOR LONG TERM ARCHIVING OF DATA IN A MES SYSTEM

CROSS-REFERENCE TO RELATED APPLICATION

This application claims the priority, under 35 U.S.C. §119, of European application EP 12 189 048.7, filed Oct. 18, 2012; the prior application is herewith incorporated by reference in its entirety.

BACKGROUND OF THE INVENTION

Field of the Invention

The present invention relates to a method and to a system for transferring data to be archived from a runtime database into a long-term archive database in a MES system according to the preamble of the independent claims.

In the world of industrial automation of today, in order to increase competitiveness, manufacturing companies need to simultaneously reduce time-to-market, increase process visibility and production flexibility, optimize forecasting and scheduling, and reduce scrap, stock levels and downtimes; all while ensuring optimal quality and production efficiency across all global facilities.

Hence in order to meet these demanding goals, manufacturing companies require an integrated IT infrastructure that helps them in coordinating production on a global scale and, if necessary, in real time. The manufacturing execution system (MES) is generally known as the IT layer that integrates the business systems (e.g. ERP) and production control systems.

Siemens corporation offers a broad range of MES products, under its SIMATIC® product family.

As defined by the Manufacturing Enterprise Solutions Association (MESA International), the MES system "is a dynamic information system that drives effective execution of manufacturing operations", by managing "production operations from point of order release into manufacturing to point of product delivery into finished goods" and by providing "mission critical information about production activities to others across the organization and supply chain via bi-directional communication." The international standard for developing MES systems is commonly referred as ISA-95 or S95.

In a long term archive (LTA) procedure, old data has to be transferred from a runtime database to an archive database.

It is known that the LTA procedure has the drawback of being usually a resource consuming task, especially if the runtime database contains a large amount of data and/or is frequently accessed as it is often the case in MES systems. In such cases, there might be problems of reduced performances and of data inconsistency. In fact, during an archiving procedure, there might be a cross-check within the corresponding tables of the runtime and long-term archive databases in order to choose the data already present in the archiving database which has to be deleted from the runtime one. This kind of check could hinder the inserting of data in a table and, in the meanwhile, some data could be changed. For example, orders from the order table older than 1.1.2012 are already in the long-term archiving database and the order tables in the runtime and archiving database have to be cross-checked in order to determine the orders to be deleted in the runtime table, with loss of performance in the runtime environment. For instance, an order detail could be erroneously changed due to the inconsistency created during the archiving.

In the art, in scenarios in which runtime databases need to be frequently accessed, a known solution is to perform the archiving procedure at given scheduled times in which the production may be stopped or slowed so that the risk of bottlenecks during production is minimized.

However, unfortunately, in the MES world, there are some manufacturing scenarios in which the production cannot be stopped or slowed.

BRIEF SUMMARY OF THE INVENTION

It is therefore the aim of the present invention to overcome the above mentioned drawbacks, i.e. reduced performances and data inconsistencies, by providing a method and a system for system for transferring data to be archived from a runtime database into a long-term archive database in a MES system which minimize the load on the runtime database.

The aforementioned aim is achieved by a method and a system for transferring data to be archived from a runtime database into a long-term archive database in a MES system. The runtime database contains a set of runtime tables, each runtime database table relating to a MES component and having a specific data structure. The long-term archive database contains a set of long-term archive tables, the set of long-term archive tables is mirroring the set of runtime tables, meaning that each long-term archive table has the same data structure of its corresponding runtime table. According to specific archiving criteria, one selects a set of data records to be archived in the runtime database, the data archiving being performed by transferring the selected record set from a subset of runtime tables to their corresponding subset of long-term archive tables. In step a) an additional database, herein after referred to as a temporary database acting as buffer database for the selected data record set to be archived is provided. In step b) for each table of the runtime table subset, create a corresponding matching table in the temporary database so as to generate a set of temporary tables. In step c) copy, for each table of the runtime table subset, the selected record subset to be archived into its corresponding table of the temporary table set in the temporary database. In step d) copy, for each table of the temporary table set, the selected record subset to be archived into its corresponding table of the long-term archive table subset in the long-term archive database. In step e), if the copying step d) is successful, creating, for each table of the temporary table set, a temporary deletion table containing a set of primary keys of the records to be deleted from the runtime database. The primary key set being extracted from the temporary table so as to generate a set of temporary deletion tables within the temporary database. In step f) in the runtime database, for each runtime table having a corresponding temporary deletion table of the set of temporary deletion tables, deleting each record having primary key matching the primary key of the primary key set of its corresponding temporary table. Wherein items c), d) and step e) are executed under a same transaction and wherein item f) is executed under another transaction.

Furthermore, a computer program element can be provided, containing computer program code for performing steps according to the above mentioned method when loaded in a digital processor of a computing device.

Additionally, a computer program product stored on a computer usable medium can be provided, containing computer readable program code for causing a computing device to perform the mentioned method.

Embodiments of the invention enable improving performances by reducing the load on the runtime database and allow checks on data consistency whilst sparing the runtime database from excessive work.

Other features which are considered as characteristic for the invention are set forth in the appended claims.

Although the invention is illustrated and described herein as embodied in a long term archiving of data in a MES system, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWING

The single FIGURE of the drawing is a block diagram schematically illustrating database interactions according to an example embodiment of the invention.

DESCRIPTION OF THE INVENTION

Referring now in detail to the single FIGURE of the drawing, there is shown a process in which data are to be archived from a runtime database RT_DB into a long-term archive database LTA_DB in a MES system.

The runtime database RT_DB contains a set of runtime tables, where each runtime database table relates to a MES component and has a specific data structure.

For example, let us describe an example embodiment with a simple scenario in which the runtime database RT_DB contains a product production rule table, a product segment table and a material specification table as respectively shown in Tables 1, 2 and 3 below. Data present in such tables is much simplified. Each MES component table has a data structure including primary keys (see column PK in Tables 1, 2 and 3) and other specific data. For example:

As shown in Table 1, the specific data of the Product Production Table (called PPR_Table_runtime) are the ID, the Status and the Last Date of a given product production rule.

As shown in Table 2, the specific data of the Product Segment Table (called PS_Table_runtime) are the primary keys of the corresponding product production rule (PPR_PK) of a given product segment and the ID of a given product segment.

As shown in Table 3, the specific data of the Material Specification Table (called MatSpec_Table_runtime) are the primary keys of the corresponding product segment (PS_PK) and the ID of a material specification.

TABLE 1

Product Production Rule Table of the runtime database
PPR_Table_runtime

| PK | ID | Status | LastDate |
|---|---|---|---|
| 1 | PPR_2 | Editing | 2012-02-02 |
| 2 | PPR_3 | Approved | 2011-10-25 |
| _3_ | _PPR_4_ | _Obsolete_ | _2012-01-02_ |
| 4 | PPR_5 | Editing | 2012-04-05 |
| 5 | PPR_6 | Approved | 2012-03-05 |
| _6_ | _PPR_7_ | _Obsolete_ | _2012-01-02_ |

TABLE 1-continued

Product Production Rule Table of the runtime database
PPR_Table_runtime

| PK | ID | Status | LastDate |
|---|---|---|---|
| 7 | PPR_8 | Approved | 2012-04-04 |
| 8 | PPR_9 | Editing | 2012-03-01 |

TABLE 2

Product Segment table of the runtime database
PS_Table_runtime

| PPR_PK | PK | ID |
|---|---|---|
| 1 | 1 | PS_1 |
| 1 | 2 | PS_2 |
| 2 | 3 | PS_1 |
| _3_ | _4_ | _PS_1_ |
| _3_ | _5_ | _PS_2_ |
| _3_ | _6_ | _PS_3_ |
| 7 | 7 | PS_1 |
| 8 | 8 | PS_2 |

TABLE 3

Material Specification Table of the runtime database
MatSpec_Table_runtime

| PS_PK | PK | ID |
|---|---|---|
| 1 | 1 | MatSpec_a |
| 2 | 2 | MatSpec_a |
| 2 | 3 | MatSpec_b |
| _4_ | _4_ | _MatSpec_b_ |
| _4_ | _5_ | _MatSpec_c_ |
| _5_ | _6_ | _MatSpec_d_ |
| 7 | 7 | MatSpec_d |
| 7 | 8 | MatSpec_e |

The long-term archive database LTA_DB contains a set of long-term archive tables, mirroring the set of runtime tables, meaning that each long-term archive table has the same data structure of its corresponding matching runtime table.

Thus, for the above simple example scenario:
the product production rule table (called PPR_Table_Ita, not shown) in the long-term archive database LTA_DB shall have a data structure including PK, ID, Status, LastDate;
the product segment table (called PS_Table_Ita, not shown) in the long-term archive database LTA_DB shall have a data structure including PPR_PK, PK, ID; and
the material specification table (called MatSpec_Table_Ita, not shown) in the long-term archive database LTA_DB shall have a data structure including PS_PK, PK, ID.

It is noted that, for the sake of clarity, the tables in the runtime database and long-term archive database have been named with the postfixes "_runtime", "_Ita" respectively while, usually, in the implementation the postfix is not necessary since the table are located in different databases.

According to some specific archiving criteria, a set of data records to be archived is selected in some MES component tables in the runtime database RT_DB. For the above simple scenario, the data records to be archived are the two with the oldest date, which highlighted with a format "Italic" and "underlined".

In order to perform the data archiving of the selected set of data records, the selected record set needs to be transferred from a subset of runtime tables in the runtime database RT_DB to their corresponding subset of long-term archive tables in the long-term archive database LTA_DB.

According to the proposed invention, an additional database is provided, called temporary database TMP_DB acting as buffer database for the selected data record set to be archived.

Once the record data set to be archived has been selected in the runtime database RT_DB, for each table of the runtime table subset containing at least one of such selected record data, a corresponding matching table in the temporary database TMP_DB is created so as to generate a set of temporary tables which are initially empty. The advantage of having initially empty temporary tables is that step STc is performed in a faster manner reduced the need of controls on primary key duplications which are then performed on a later stage on the long term archive database LTA_DB.

Thus, for the above simple example scenario:
an empty temporary product production rule table (called PPR_Table_temp, not shown) in the temporary database TMP_DB is created and it shall have a data structure including PK, ID, Status, LastDate;
an empty product segment table (called PS_Table_temp, not shown) in the temporary database TMP_DB is created and it shall have a data structure including PPR_PK, PK, ID; and
an empty material specification table (called MatSpec_Table_temp, not shown) in the temporary database TMP_DB shall have a data structure including PS_PK, PK, ID.

According to the proposed invention, at step STc, for each table of the runtime table subset, the selected record subset to be archived is copied into its corresponding matching table of the temporary table set of the temporary database TMP_DB.

Thus, for the above simple example scenario, step STc is performed as follows:
from the runtime table PPR_Table_runtime of the runtime database RT_DB, the highlighted selected data records, i.e. the ones having primary key 3 and 6, are copied into the corresponding temporary table PPR_Table_temp in the temporary database TMP_DB;
from the runtime table PS_Table_runtime of the runtime database RT_DB, the highlighted selected data records, i.e. the ones having primary key 4, 5 and 6, are copied into the corresponding temporary table PS_Table_temp in the temporary database TMP_DB; and
from the runtime table MatSpec_Table_runtime of the runtime database RT_DB, the highlighted selected data records, i.e. the ones having primary key 4, 5 and 6, are copied into the corresponding temporary table MatSpec_Table_temp in the temporary database TMP_DB.

At step STd, for each table of the temporary table set, the selected record subset to be archived is copied into its corresponding table of the long-term archive table subset of the long-term archive database LTA_DB.

Thus, for the above simple example scenario, step STd is performed as follows:
from the temporary table PPR_Table_temp of the temporary database TMP_DB, the selected data records, i.e. the ones having primary key 3 and 6, are copied into the corresponding long-term archive table PPR_Table_Ita in the long-term archive database LTA_DB;
from the temporary table PS_Table_temp of the temporary database TMP_DB, the selected data records, i.e. the ones having primary key 4, 5 and 6, are copied into the corresponding long-term archive table PS_Table_Ita in the long-term archive database LTA_DB; and
from the temporary table MatSpec_Table_temp of the temporary database TMP_DB, the selected data records, i.e. the ones having primary key 4, 5 and 6, are copied into the corresponding long-term archive table MatSpec_Table_Ita in the long-term archive database LTA_DB.

According to the proposed invention, a check is performed in order to evaluate whether the copying of step STd is successful, i.e. no errors happened such as crashes or manual mishandlings of the databases so that inconsistencies are created.

If the copying of step STd is successful, at step STe, for each table of the temporary table set, a temporary deletion table is created, containing a set of primary keys of the records to be deleted from the runtime database RT_DB, such primary key set is extracted from the temporary table so as to generate a set of temporary deletion tables within the temporary database TMP_DB.

Thus, for the above simple example scenario, with the assumption that step STc was successful, step STe is then performed as follows:
three deletion tables (called PPR_Table_del, PS_Table_del and MatSpec_Table_del shown respectively in below Tables 4, 5, and 6) are created in the temporary database TMP_DB (e.g. via an output command in C sequel), where PPR_Table_del has PK 3 and 6; PPR_Table_del has PK 4, 5 and 6; and MatSpec_Table_del has PK 4, 5 and 6. For example, in an embodiment in which MS SQL Server is used, the deletion tables "*_del" may be created by using an output clause in the T-SQL query used to insert the data from the "*_temp" table to the "*_Ita" table.

TABLE 6

| MatSpec_Table_del |
| PK |
| --- |
| 4 |
| 5 |
| 6 |

TABLE 5

| PS_Table_del |
| PK |
| --- |
| 4 |
| 5 |
| 6 |

TABLE 4

| PPR_Table_del |
| PK |
| --- |
| 3 |
| 6 |

According to the proposed invention, in the runtime database RT_DB, for each runtime table having a corresponding temporary deletion table of the set of temporary deletion tables, at step STf, each record having primary key matching the primary key of the primary key set of its corresponding temporary table is deleted.

Thus, for the above simple example scenario, step STf is performed as follows:
in the runtime table PPR_Table_runtime of the runtime database RT_DB, the data records having primary key 3 and 4 (as seen in PPR_Table_del) are deleted (e.g. with a join command);

in the runtime table PS_Table_runtime of the runtime database RT_DB, the data records having primary key 4, 5 and 6 (as seen in PS_Table_del) are deleted; and in the runtime table MatSpec_Table_runtime of the runtime database RT_DB, the data records having primary key 4, 5 and 6 (as seen in MatSpec_Table_del) are deleted.

Hence, with the proposed invention, a suitable set of queries is to be executed in stored procedures, according to three main operation phases which can be called importing (i.e. step STc), exporting (i.e. steps STd and STe) and deleting (i.e. step STf).

By splitting the archiving procedure in the above three phases/operations several technical advantages are achieved.

The deleting operation can be advantageously scheduled at a convenient time after the importing and exporting operation according to production requirements.

For example, by following specific production needs, in case of a manufacturing pattern of 24/5, in order not to slow the runtime database activity, several small amounts of data can be scheduled on a week-daily basis to be imported and exported, while the deleting operation can be scheduled on a Saturday or Sunday (when the runtime database is not accessed) by deleting in the runtime database RT_DB all the data record data were successfully copied in the long-term archive database LTA_DB. It is noted that it may be often the case, in real scenarios, that the importing and exporting operations are less time consuming than the deleting operation. In fact, the importing and exporting operations relate to a single reading from the runtime database and to an insert into the long-term archive database, the latter being much less accessed then the runtime database. Instead, the deleting operation is usually to be executed in addition to the normal runtime database activities.

Another advantage of the splitting is that, with embodiments of the proposed invention, the usual controls to be performed in an archive procedure (e.g. check on key duplication, on data on consistency and on constraints) are mainly concentrated during the export and import operations minimizing the load on the runtime database RT_DB. Conveniently, sophisticated ad-hoc controls can be designed.

In addition, by using the deletion tables with the primary keys of the data to be deleted, the deletion operation in the runtime database RT_DB is faster. In fact, in such a manner it is required to cross-check for differences between a table of the runtime database and a table in the temporary database containing uniquely the data to be deleted, while with prior art procedures, it is required to cross-check between the runtime and long-term archiving tables where both are containing all archived data and not only the data to be archived in a single operation as it is the case with the table of the temporary database.

According to the proposed invention, the importing operation STc and exporting operation STd, STe are executed under the same transaction and the deleting operation STf is executed under another transaction. As used herein, a transaction is a set of database statements that can be successfully executed all at once or fail all at once, and cannot be partially executed, so that the preservation of data consistency is ensured.

In case of failure, during operations under transaction, an entire rollback is therefore needed. Error notifications may be reported via pop-up windows or log-files. In case of successful archive, data of the temporary database can be deleted upon need or kept as an 'emergency resource' since it contains the data cleared in the last transfer.

Moreover, with embodiments of the proposed invention: the stress on the runtime database RT_DB is quite reduced, because, in the export phase, there may just be a simple filtered "select into" transfer and the management and the checks involve only the temporary and the long-term database, sparing the run-time from unnecessary work. Hence, the number of accesses to the runtime database and the employed time are reduced; and since the temporary database contains deletion tables having only the primary keys of the data to be cleared, time and joins for the deletion in the runtime database are spared.

Although the invention has been described with particular reference to a preferred embodiment, it will be evident, to those skilled in the art, which the present invention is not limited thereto, but further variations and modifications may be applied without departing from the scope of the invention as defined by the annexed claims.

The invention claimed is:

1. A method for transferring data to be archived from a runtime database into a long-term archive database in a manufacturing execution system (MES), which comprises the steps of:

a) providing the runtime database with a set of runtime tables, each of the runtime tables relating to a MES component and having a specific data structure;

b) providing the long-term archive database with a set of long-term archive tables, the set of long-term archive tables mirroring the set of runtime tables, meaning that each long-term archive table has a same data structure of a corresponding runtime table;

c) according to specific archiving criteria, selecting a set of data records to be archived in the runtime database, data archiving being performed by transferring a selected data record set from a subset of the runtime tables to a corresponding subset of the long-term archive tables;

d) providing an additional database being a temporary database acting as a buffer database for the selected data record set to be archived;

e) creating, for each table of a runtime table subset, a corresponding matching table in the temporary database so as to generate a set of temporary tables;

f) copying, for each table of the runtime table subset, the selected record subset to be archived into a corresponding table of the temporary table set in the temporary database;

g) copying, for each table of the temporary table set, the selected record subset to be archived into a corresponding table of the long-term archive table subset in the long-term archive database;

h) if the copying of the step g) is successful, creating, for each table of the temporary table set, a temporary deletion table containing a set of primary keys of records to be deleted from the runtime database, the set of primary keys being extracted from the temporary table so as to generate a set of temporary deletion tables within the temporary database;

i) in the runtime database, for each runtime table having a corresponding temporary deletion table of the set of temporary deletion tables, deleting each record having primary key matching the primary key of the primary key set of its corresponding temporary table; and j) executing the steps f), g) and step h) under a same transaction and wherein step i) is executed under another transaction.

2. A system performing a method for transferring data to be archived from a runtime database into a long-term archive database in a manufacturing execution system (MES), the MES comprising:

a computing device programmed to:
a) provide the runtime database with a set of runtime tables, each of the runtime tables relating to a MES component and having a specific data structure;
b) provide the long-term archive database with a set of long-term archive tables, the set of long-term archive tables mirroring the set of runtime tables, meaning that each long-term archive table has a same data structure of a corresponding runtime table;
c) according to specific archiving criteria, select a set of data records to be archived in the runtime database, data archiving being performed by transferring a selected data record set from a subset of the runtime tables to a corresponding subset of the long-term archive tables;
d) provide an additional database being a temporary database acting as a buffer database for the selected data record set to be archived;
e) create, for each table of a runtime table subset, a corresponding matching table in the temporary database so as to generate a set of temporary tables;
f) copy, for each table of the runtime table subset, the selected record subset to be archived into a corresponding table of the temporary table set in the temporary database;
g) copy, for each table of the temporary table set, the selected record subset to be archived into a corresponding table of the long-term archive table subset in the long-term archive database;
h) if the copying of the step g) is successful, create, for each table of the temporary table set, a temporary deletion table containing a set of primary keys of records to be deleted from the runtime database, the set of primary keys being extracted from the temporary table so as to generate a set of temporary deletion tables within the temporary database;
i) in the runtime database, for each runtime table having a corresponding temporary deletion table of the set of temporary deletion tables, deleting each record having primary key matching the primary key of the primary key set of its corresponding temporary table; and
j) execute the steps f), g) and step h) under a same transaction and wherein step i) is executed under another transaction.

3. A non-transitory computer readable medium having computer executable instructions for performing a method for transferring data to be archived from a runtime database into a long-term archive database in a manufacturing execution system (MES), which method comprises the steps of:
a) providing the runtime database with a set of runtime tables, each of the runtime tables relating to a MES component and having a specific data structure;
b) providing the long-term archive database with a set of long-term archive tables, the set of long-term archive tables mirroring the set of runtime tables, meaning that each long-term archive table has a same data structure of a corresponding runtime table;
c) according to specific archiving criteria, selecting a set of data records to be archived in the runtime database, data archiving being performed by transferring a selected data record set from a subset of the runtime tables to a corresponding subset of the long-term archive tables;
d) providing an additional database being a temporary database acting as a buffer database for the selected data record set to be archived;
e) creating, for each table of a runtime table subset, a corresponding matching table in the temporary database as to generate a set of temporary tables;
f) copying, for each table of the runtime table subset, the selected record subset to be archived into a corresponding table of the temporary table set in the temporary database;
g) copying, for each table of the temporary table set, the selected record subset to be archived into a corresponding table of the long-term archive table subset in the long-term archive database;
h) if the copying of the step g) is successful, creating, for each table of the temporary table set, a temporary deletion table containing a set of primary keys of records to be deleted from the runtime database, the set of primary keys being extracted from the temporary table so as to generate a set of temporary deletion tables within the temporary database;
i) in the runtime database, for each runtime table having a corresponding temporary deletion table of the set of temporary deletion tables, deleting each record having primary key matching the primary key of the primary key set of its corresponding temporary table; and
j) executing the steps f), g) and step h) under a same transaction and wherein step i) is executed under another transaction.

* * * * *